J. J. BAILEY.
PORTABLE RACK.
APPLICATION FILED APR. 11, 1912.
1,039,080.
Patented Sept. 24, 1912.
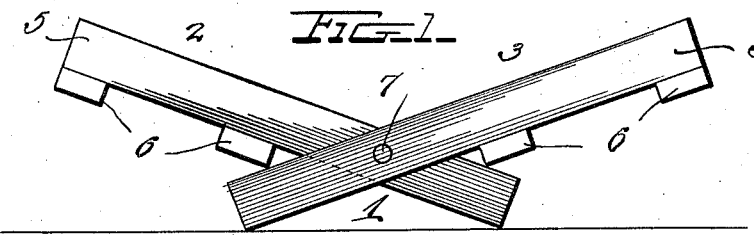
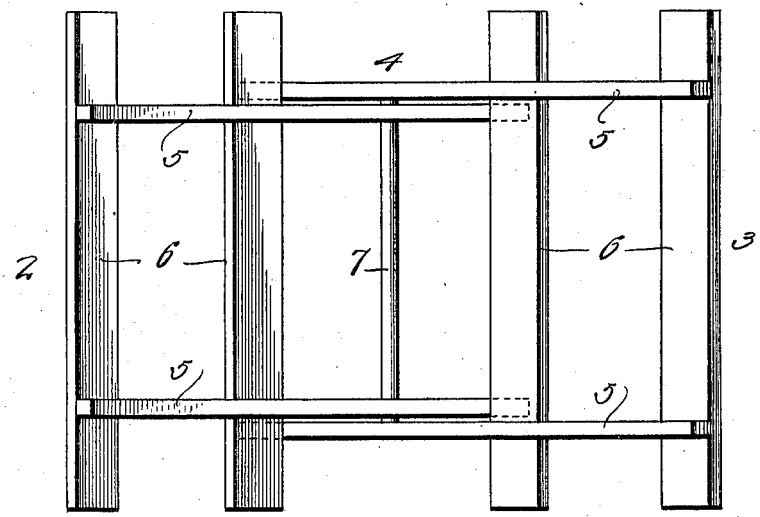
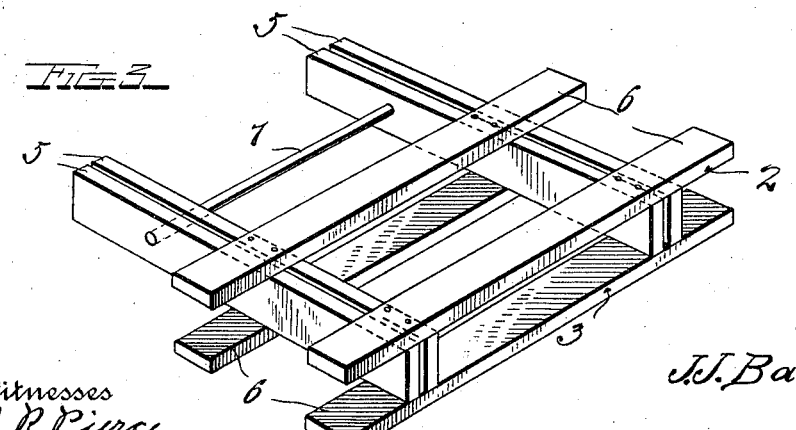
Inventor
J. J. Bailey

UNITED STATES PATENT OFFICE.

JOHN J. BAILEY, OF UBLY, MICHIGAN.

PORTABLE RACK.

1,039,080.  Specification of Letters Patent.  Patented Sept. 24, 1912.

Application filed April 11, 1912. Serial No. 690,037.

*To all whom it may concern:*

Be it known that I, JOHN J. BAILEY, a citizen of the United States, residing at Ubly, in the county of Huron and State of Michigan, have invented certain new and useful Improvements in Portable Racks; and I do declare the following to be a full, clear, and exact description of the invention, such as will enable others skilled in the art to which it appertains to make and use the same.

This invention relates to an improved portable rack which may be readily moved from place to place and is especially designed for supporting beans, peas or any seed or other article which it may be desired to support above or out of contact with the ground.

The object of the invention is to provide a simple, cheaply constructed rack of this character which is light, and may be readily moved from place to place, and which will efficiently support articles placed thereon out of contact with the earth.

With this and other objects in view, the invention consists of certain novel features of construction, and the combination and arrangement of parts as will be more fully described and claimed.

In the accompanying drawings: Figure 1 represents a side elevation of this improved rack; Fig. 2 represents a top plan view thereof in open position; Fig. 3 is a perspective view of the rack in closed position.

In the embodiment illustrated, a portable seed or plant supporting rack 1 is shown, composed of frames 2 and 3 hingedly connected near one end thereof as at 4, each of said frames consisting of side rails 5 connected by cross bars 6 spaced longitudinally at suitable distances apart, the opposite ends of said cross bars preferably projecting beyond said side rails. These cross bars 6 are preferably secured to the lower edge of the side rails as shown, and any desired number thereof may be employed. A spindle 7 connects the side bars of the frame 2 at points spaced from the ends thereof and the side bars of the other frame 3 are loosely mounted on said spindle within the side bars of the frame 2 and adjacent thereto, said spindle extending through the side bars of the frame 3 at the same distance from the ends thereof that it extends through the side bars of the frame 2 to provide supporting feet of legs for the rack, the inner cross bars of the frames 2 and 3 being engaged by the side bars of the adjacent frames, which cross bars limit the opening movement of said frames relatively to each other and dispose them a suitable distance above the supporting surfaces. When the rack is not in use the frame 3 may be folded into the frame 2, as shown clearly in Fig. 3 and the rack may be transported and stored in a comparatively small space without danger of the members becoming broken.

This improved rack is especially useful for truck farmers when gathering bean vines, which will readily rot when left on the ground, but it may be used for any other desired purpose.

I claim as my invention:

A portable rack comprising frames pivotally connected near one end thereof to fold one within the other, and each composed of side bars connected by longitudinally spaced cross bars secured to the edges of said side bars, the cross bars of one frame being arranged to engage the free edges of the side bars of the other frame when in open position for limiting the opening movement of said frames.

In testimony whereof I have hereunto set my hand in presence of two subscribing witnesses.

JOHN J. BAILEY.

Witnesses:
 F. H. BROWN,
 GUY M. LEACH.

Copies of this patent may be obtained for five cents each, by addressing the "Commissioner of Patents, Washington, D. C."